Dec. 12, 1950  C. S. HAZARD  2,533,319
REGISTERING AND METERING SYSTEM
Filed March 26, 1945  2 Sheets-Sheet 1
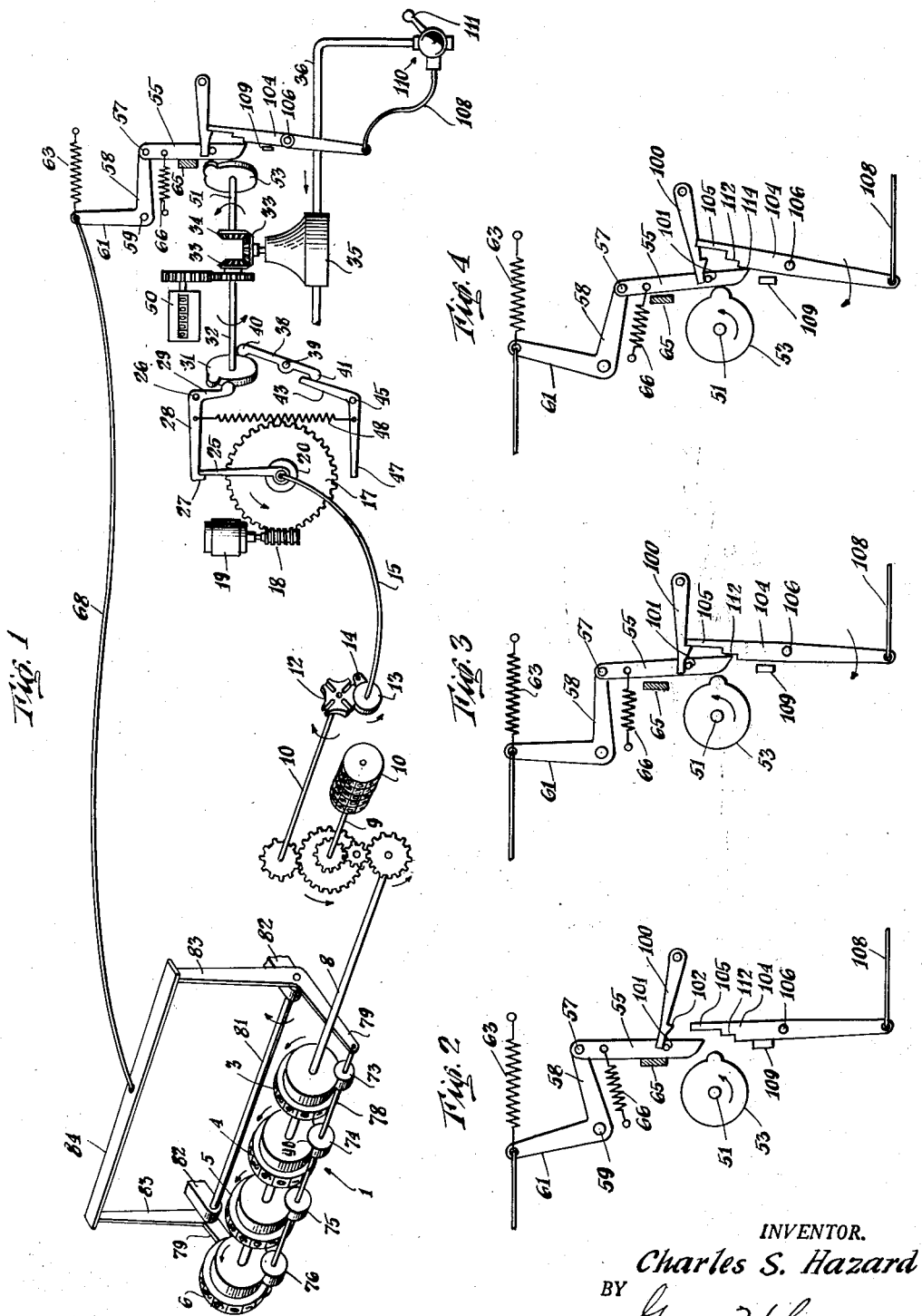
INVENTOR.
Charles S. Hazard
BY George H. Corey
ATTORNEY Dec. 12, 1950
C. S. HAZARD
2,533,319
REGISTERING AND METERING SYSTEM
Filed March 26, 1945
2 Sheets-Sheet 2
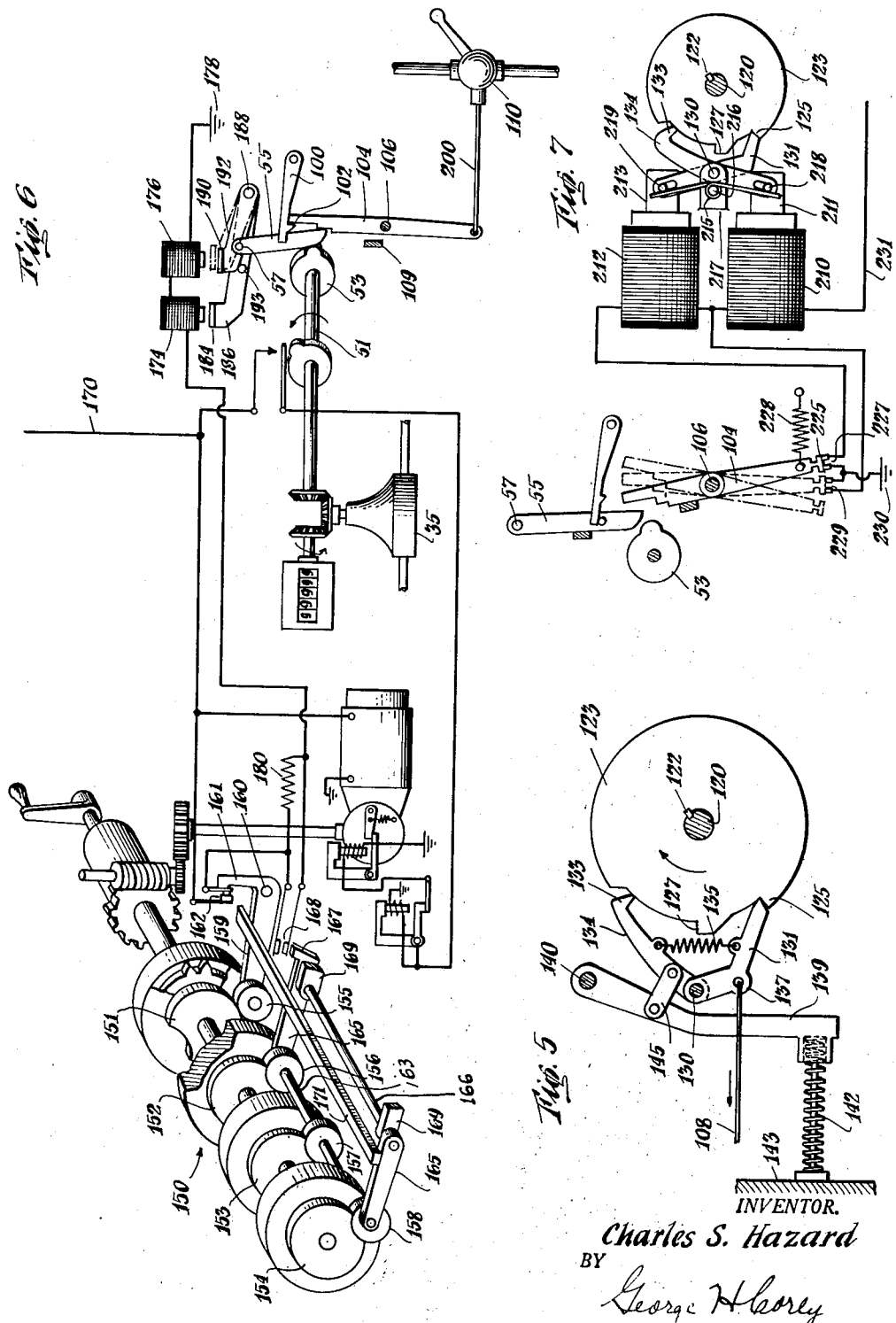
INVENTOR.
Charles S. Hazard
BY George H Corey
ATTORNEY Patented Dec. 12, 1950

2,533,319

UNITED STATES PATENT OFFICE 2,533,319

REGISTERING AND METERING SYSTEM

Charles S. Hazard, Andover, N. J., assignor to Neptune Meter Company, a corporation of New Jersey Application March 26, 1945, Serial No. 584,969

12 Claims. (Cl. 222—20)

This invention relates to dispensing apparatus and more especially to apparatus for measuring and for registering or recording the measurement of material dispensed.

The invention particularly relates to dispensing of fluids, such as gasoline or other liquids, and to the operative connections which must be provided between the fluid meter or other measuring device and the register.

In apparatus of this type, usually a register constructed to integrate in predetermined units the amount of the material delivered concomitantly with measurement thereof by the meter is operably connected to the meter so that measuring movement of an element of the meter will be transmitted to the register. A settable register, which may be of the auto-stop type, may be thus connected to the meter and, upon return thereof to its initial or zero position, may be effective to stop delivery of the material or flow of the fluid through the meter.

In installations of this kind it frequently is desirable to locate the meter and the device for controlling delivery of the material at a place more or less remote from the location of the register. In gasoline distributing plants, for example, the loading station may be located in the yard accessible to trucks or other vehicles and economy of construction as well as convenience makes it desirable to locate the meter and the control valves at or near the loading station. The registering and recording devices, however, preferably are located in an office which may be some distance from the loading station. Conditions of arrangement and simplicity make it desirable to provide flexible connections between the meters located at the loading station and the register which may be bent around corners or carried around obstructions while remaining operative. Although in some cases these purposes may be accomplished by electrical means, in others convenience or cost or other conditions may make it desirable to provide, in whole or in part, mechanical connections between the meters and the register.

In the application of Hazard and Shipman, Serial No. 448,644, filed June 26, 1942 is disclosed apparatus for dispensing fluids in which electrical connections are provided between the meter and the register; also electrical means for driving the register which are under control of the meter. The electrical means are so constructed and are so controlled by the meter that step by step integrating movement of the register is produced in correspondence with the measuring of the fluid in successive units by the meter. Electrical means also are disclosed in said application for operating the fluid control valve first under control of the register to reduce flow of the fluid when the delivery approaches completion and then under control of the meter precisely upon completion of the last unit measured by the meter to stop delivery by closing the valve.

One of the objects of the invention is to provide in dispensing apparatus of the type above-referred to connections between the meter and the register which have the desired flexibility and which are mechanically operative for driving the register.

A further object of the invention is to provide between the register and the delivery control means, such as a valve, connections having the desired flexibility which include mechanically operative means which cooperate with the meter to operate the delivery control means.

Another object of the invention is to provide a mechanically operative connection, which may be flexible, between the register and the control device, such as a valve controlling flow of fluid through the meter, for operating the valve under control of the register until a predetermined amount has been metered and registered.

Another object of the invention is to provide an operative connection between the register and the valve which includes mechanical means which is under the control of the register but which also is effective to make the meter dominant in controlling the valve to effect final closure thereof to stop the flow of the material through the meter.

An important object of the invention is to provide apparatus, which includes mechanically functioning means as above-mentioned, which will insure completion of the measurement by the meter in full units in agreement with the amount registered by the register.

It is a further object of the invention to provide apparatus of the type above-referred to in which the meter will be effective to operate the delivery control means or the valve to stop delivery precisely at the completion of a full unit of measurement after the register has relinquished control of the metering and registering operation.

A still further object of the invention is to provide a mechanical device actuated by the meter and under control of an auto-stop register which will effect reduction of the flow of the material through the meter upon completion of registration of a predetermined amount and thereafter will be effective to stop delivery of the material precisely upon completion of actual measurement of the last unit of material measured and delivered through the meter.

The invention will be described in more detail in connection with a fluid meter and a register of the auto-stop type and a valve constructed to be operated to move from its open position to a position in which it is partially open and, after having been arrested at said partially open position, capable of being further moved to its closed position.

For the accomplishment of the above objects the invention provides, among other features, mechanically operative devices, which may include power means for relieving the meter of the driving load, which connect the meter to the register to produce registering operation thereof. This driving connection may include a shaft or other element, preferably a flexible shaft, capable of transmitting driving movement by rotation. The devices comprised in this driving connection preferably are designed to effect step by step movement of the register concomitantly with the completion of movement, particularly of rotation, of an element of the meter which measures a unit or other desired increment of measurement.

The invention also provides a connection, which may include a flexible or Bowden type cable, between the register and a member arranged to be movable in a path which may include an initial or withdrawn position, a second or intermediate position and a third or advanced position. Said member may be moved between said initial and said second or said third positions upon setting or return movement of the register by virtue of the pull or push action of said connection. Said member is arranged to be engaged by an element actuated by the meter and to be moved thereby locally while in said intermediate position. Said member and said meter actuated element are also arranged so that when the member is moved to the advanced position, it may be actuated by said element for local movement in said advanced position. Means are provided to utilize the local movement of said member in these two positions and to transmit this movement to the valve so as to effect closing movement thereof. When a valve of the construction above referred to having a two-step closing movement is used, operation thereof to the partially open position is secured when said member is actuated for local movement in said second position, said valve being thereafter operated to move to closed position when said member is actuated for local movement in said third position.

It is a particular feature of the invention that said member is moved by the auto-stop register so as to be interposed, when said auto-stop register has returned to a predetermined reading or to zero, between an element actuated by the meter and means connected to the valve. Upon such interposition of said member respectively in the two positions, intermediate or advanced, as above described the meter becomes effective to operate the valve in closing movement to a partially open position and finally to effect full closing thereof upon completion of the last full unit measured by the meter.

In the preferred arrangement a valve which is biased to its closed position is used. Means are provided in connection with this valve for opening the valve by hand or otherwise against its bias and means also are provided which are effective to restrain the valve in open position against its bias. This restraining means is constructed so that it may be operatively connected to said member to release said valve to move toward its closed position but to intercept and arrest said movement before said valve reaches closed position. This action may take place when the member is actuated in said second or intermediate position. When the member is actuated in the third or advanced position, the restraining means is again actuated to release the valve to move to fully closed position.

Within the scope of the invention movement of the member in said path between said initial position and said second and third positions, may be effected by electrical means. Such electrical means may be actuated by the auto-stop or similar settable register. Electrical means may also be used to operate the restraining means above referred to so as to operate the valve as above described.

It is an important feature of the invention in its various embodiments that the member, arranged for movement to the initial position upon setting of the auto-stop register, is moved successively to its interposing positions when the register (1)— has integrated a predetermined number of units less than the total amount to be dispensed and, (2)—thereafter has completed the registration, that is, has returned to zero. The member thus moved by the register first initiates control by the meter for partial closure of the valve and finally causes the meter to dominate the control of the valve for effecting final closure thereof.

The integrating movement of the register for each unit registered thereby may be completed slightly in advance of the actual completion by the meter of measurement of each such unit and in advance of the last of the total number of units dispensed. The arrangement of the member with respect to the element which is actuated by the meter and with respect to the devices and parts which are operated by said member in this case also is such that they are effective to produce first the partial closing of the valve and thereafter full closure precisely upon completion of the last unit, although this final closure may occur after completion of the registration by the register of said last unit.

The invention will be further explained in connection with the drawings in which Fig. 1 shows a diagrammatic arrangement of a register, a meter and a valve to control the flow of fluid through the meter together with devices embodying the invention.

Figs. 2, 3 and 4 show three operative positions of certain parts shown in Fig. 1.

Fig. 5 is a diagrammatic illustration of means for controlling the operation of the valve in two steps.

Fig. 6 shows a modification of the invention of Fig. 1.

Fig. 7 shows a modification of the device of Fig. 6 utilizing electrically operated means for effecting operation of the valve.

In Fig. 1 the essential elementary parts of an auto-stop register are shown generally at 1 consisting of the numeral wheels 3, 4, 5 and 6 arranged on shaft 8 driven through a suitable train of gearing from shaft 10. This train of gearing also drives shaft 9 of an integrating register 11. Mounted on shaft 10 is a star wheel 12 of a Geneva movement, the driving element 13 of which is provided with a single indexing pin 14, the star wheel 12 being provided with four lobes for engagement of the indexing pin 14 upon rotation of the driving element 13 fastened upon flexible shaft 15. The flexible shaft at its opposite end is connected through a friction clutch or similar device 20 to the worm gear 17 driven by worm 18 fastened upon the shaft of motor 19. The motor 19 is driven in such direction in consideration of the hand of the thread on the worm 18 that the worm gear 17 is rotated in the direction of the arrow. The motor may run continuously to continuously rotate the worm gear 17, the friction clutch or similar device, which may be of conventional design, providing for continuance of the rotation of the worm gear 17 when rotation of shaft 15 is arrested.

Fastened upon the shaft 15, or the portion of the friction clutch to which it is connected, is a trip arm 25 which when released is driven to rotate with the shaft 15 by the frictional drive of the clutch above referred to. In the position shown in Fig. 1 the trip arm 25 is held against rotation by the hook 27 of the bell crank lever 28 pivotally supported at 26. The arm 29 of said bell crank is arranged for engagement by a cam 31 as it rotates, said cam being fastened upon a shaft 32 driven through bevel gears 33 from the operating element of a meter 35. Also arranged for actuation by the cam 31 is the lever 38 pivotally supported at 39, the end 40 of this lever being engageable by the cam 31 as it rotates. The opposite end 41 of said lever 38 engages arm 43 of the bell crank pivotally supported at 45. The other arm 47 of said bell crank extends in such position that the end thereof is in the path of travel of trip arm 25 as it is rotated after release from the hook 27. Rotation of said trip arm is arrested by the arm 47 and rotation of the shaft 15 is stopped when, concomitantly with rotation of the trip arm 25, said shaft has rotated one-half a revolution from the position shown in Fig. 1. The levers 28, 38 and 47 are biased to the positions shown in relation to trip arm 25 and cam 31 by tension spring 48.

Release of the trip arm 25 from the hook 27 is effected by the cam 31 rotating in the direction of the arrow and acting on the arm 29 to pivotally move the bell crank 28 and to move the hook 27 upwardly out of engagement with the trip arm 25. Upon further rotation of the cam 31 its lobe engages the end 40 of the lever 38. Pivotal movement of the lever 38 moves the end 41 thereof clockwise about the pivot 39 and by contact with the arm 43 of the bell crank pivoted at 45 effects downward movement of the other arm 47. Thus, after the trip arm 25 has been released by hook 27 and has moved one-half revolution into engagement with the arm 47, it is stopped and rotation of shaft 15 is stopped. When by the action of cam 31 on lever 38 this arm 47 is moved out of engagement with the trip arm 25, said trip arm 25 rotates another one-half revolution until it is engaged again by the hook 27 of the bell crank 28.

The devices thus far described in connection with Fig. 1 make possible step by step rotation of the shaft 15 under the driving action of the motor 19. It will be apparent, upon consideration of the drawing and the above description, that in the particular embodiment illustrated and described, the shaft 15 will make one-half revolution in each one-half revolution of the shaft 32 which is driven by the meter 35. By providing a suitable ratio in the gearing 33, in consideration of the operative movement of the parts within the meter, each revolution of the shaft 32 may represent one unit of measurement by the meter. The Geneva movement also produces step by step operation of the shaft 10 in relation to the shaft 15. The ratio of the train of gearing connected between the shaft 10 and shaft 8 may be such in consideration of the ratio in the Geneva movement 12, 13, 14 that one unit will be registered by the units wheel 3 of the auto-stop register 1 for each revolution of shaft 15 and for each unit of measurement by the meter. Continuous rotation of the meter during the metering operation, transmitted through the devices shown, will produce step by step integrating rotation of the numeral wheels of said register to register or record the amount of fluid passing through the meter 35.

The devices which produce the step by step operation above referred to are arranged in relation to the shaft 15 so that such operation of the register is secured even though some torsional lag or lead may occur in said shaft 15, as when a flexible shaft is used to secure the advantages and objects of the invention above mentioned. The trip arm 25 cooperating with the cam actuated levers 28 and 47 controls the rotational movement at one end of shaft 15 and the Geneva movement 12, 13, 14 controls the rotation of shaft 10 and therefore of the register shaft 8 so that each revolution of shaft 15, corresponding to unit movement within the meter, produces the fractional rotation of the units wheel of the register representing one unit of measurement regardless of any angular lag of driving element 13 behind arm 25 or angular movement of element 13 ahead of arm 25 which may be the result of the resilience of shaft 15 as it is rotated.

If desired, also, through suitable gearing a register 50 may be driven from the shaft 32.

On the shaft 51 driven by the bevel gear 34 from the gear 33 on the meter shaft is fastened a cam 53 rotating in the direction of the arrow. The ratio of the gears 33 and 34 is such that the cam 53 is rotated once for each rotation of the cam 31, that is, once for each unit of measurement.

Adjacent the cam 53 a dog 55 is pivotally supported at 57 at the outer end of the arm 58 of the bell crank pivotally supported at 59. The upwardly extending arm 61 of said bell crank is biased by spring 63 toward the right to effect, under said bias, movement of the dog 55 downwardly. This movement of the dog 55 may take place in sliding relation to a stop 65 against which, under the bias of a spring 66, the dog 55 is held until moved therefrom by pivoting in support 57 for purposes hereafter described. This pivotal movement of dog 55 may occur as a local movement thereof, transversely of the line of movement thereof upwardly and downwardly, and may take place in any position to which the dog is moved by the bell crank arm 58.

Pivotal movement of the bell crank pivoted at 59 is effected through a connection from the auto-stop register 1 to the arm 61 of said bell crank. This connection may be any suitable mechanical connection 68 capable of transmitting force lengthwise thereof and may be in the form of a flexible or Bowden type cable or wire. Motion of translation, that is, push and pull movement of the flexible cable is secured when the auto-stop register 1 is set from the zero position to a setting corresponding to the amount of fluid to be measured by the meter 35. This movement of translation is produced by means of the rollers 73, 74, 75, 76 mounted on rod 78 supported at its ends by end members 79 connected by and fastened to the rod 81. The upwardly extending arms 83 of said end members are connected by and fastened to a bar 84. Said end members and said connections constitute a rigid frame pivotally supported in bearings 82 so that rollers 73, 74, 75 and 76 may be moved simultaneously with respect to the numeral wheels 3, 4, 5 and 6.

To the bar 84 is connected the other end of the mechanical element or Bowden cable 68, which also is connected to the upwardly extending arm of the bell crank pivoted at 59, as above mentioned. Setting of the auto-stop register 1 may be accomplished by rotation of the numeral wheels by conventional means not shown. Each wheel 3, 4, 5 and 6 is provided with a disc rotating therewith and having a notch therein into which respectively the rollers 73, 74, 75, 76 for the units, 10's, 100's and 1000's wheel enter when all of the register wheels are at zero. Upon rotating, by hand or otherwise in the presetting operation, one or more of the numeral wheels, the respective discs are rotated and the rollers 73, 74, 75 and 76 all are moved outwardly of the notches in the discs attached to the several wheels when any one disc cams its roller out of its notch. This action takes place whether one or more of said wheels are rotated in the presetting action since the frame consisting of the end members 79, 83 and the connecting rods 78 and 81 and the bar 84 moves as a unit pivotally on the rod 81.

After the register has been set to a desired setting the frame and the rollers 73, 74, 75 and 76 carried thereby may not pivot reversely, that is, in the direction of the arrow about the axis of the rod 81 until all of the notches of all of the discs are in line and all of the rollers 73, 74, 75 and 76 can enter at the same time. Such pivotal movement of the frame, when it occurs, will cause movement of the upwardly extending arm 61 of the bell crank pivoted at 59 toward the right aided by the pull of the spring 63 with concomitant downward movement of the dog 55. It will be understood that when all of the rollers 73, 74, 75 and 76 simultaneously enter the notches of the discs corresponding to the zero positions of all the numeral wheels, the dog 55 is moved to its lowermost or what has been referred to above as its third or advanced position.

In order to provide for movement of the dog 55 to a second or intermediate position between the initial set position, that is the uppermost position thereof, and said lowermost position, in the particular embodiment illustrated the roller 73 associated with the disc which is fastened to the units wheel 3 is made with a smaller diameter than the diameter of the other rollers 74, 75, 76, the diameter of the discs, however, all being the same. The notch in the disc of the units wheel is of sufficient depth to permit the roller 73 to move the full distance necessary to carry the other rollers fully into their respective notches when the numeral wheels all are at zero. The disc associated with the units wheel 3, however, acting with roller 73 prevents the rollers 74, 75, 76 from fully engaging the notches in the discs respectively of wheels 4, 5 and 6 until the units wheel 3 reaches zero, even though all of the wheels 4, 5 and 6 show zero reading. This is the condition of the register when indicating a reading of less than 10 units. Since all of the rollers 73, 74, 75 and 76 move together upon pivotal movement of the frame 79, 83, the rollers 74, 75 and 76 will move only a fraction of their full movement into their notches and only partial pivotal movement of the frame 79, 83 will be produced. The flexible cable connection therefore will move the dog 55 a fraction only of the total movement of the dog from its uppermost or initial set position to its lowermost position. Thereafter when the units wheel disc reaches zero the roller 73 fully enters its notch as also do the rollers 74, 75, 76 to the full extent and further movement of the dog to its lowermost position takes place.

It thus will be apparent that the device acting as an auto-stop register and illustrated at 1 in Fig. 1 is effective to move the dog 55 from a position to which upon setting it is withdrawn out of engagement with the cam 53, as shown in Fig. 2, to a second or intermediate position as shown in Fig. 3, and to a third or advanced position as shown in Fig. 4. In the withdrawn position of Fig. 2 the cam 53 runs clear of the dog 55, this dog being held in its uppermost position by the bell crank arm 58. The spring 66 holds the dog 55 against the stop 65. The latch 100 is lifted by pin 101 attached to dog 55 so that the hook 102 of said latch is out of engagement with the upper end 105 of the lever 104 pivoted at 106. In setting the register 1 to an amount less than 10 units the dog 55 will be moved to the position of Fig. 3 instead of to the fully withdrawn position of Fig. 2 because only the roller 73 of smaller diameter will be cammed out of its notch, that is it will move only a fraction of the full pivotal movement of the frame 79, 83.

To the downwardly extending arm of the lever 104 is attached a flexible cable or Bowden wire 108 or other element capable of transmitting motion of translation and connected, as may be seen in Fig. 1, to the valve 110 positioned in the pipe 36 through which the fluid is delivered to the meter 35. This valve preferably is constructed so as to be biased to closed position. Any conventional construction may be used in which opening movement may be effected against the bias and a valve such as that shown in my copending application Serial No. 583,429, filed March 19, 1945, now Patent No. 2,508,064, issued May 16, 1950, may be used in which the lever 111 is operable by hand to produce opening movement of the valve against its bias. By means of devices within the valve 110, or by other suitable means such as that shown in Fig. 5, the flexible connection 108 may be biased to move the lever 104 counterclockwise about the pivot 106. The stop 109 limits this motion so that the dog 55 therefore may pass between the face of the step 112 on the lever 104 and the cam 53 as the cam 53 rotates on the shaft 51.

As will be seen from Fig. 3, the lobe of the cam 53 in the rotation thereof comes into contact with the lower end of the dog 55 and effects local pivotal movement of said dog about the pivot 57. The toe of the dog 55 engages the step 112 and moves the lever 104 on pivot 106 in the clockwise direction, the latch 100 being now in a lowered position so as to engage the end 105 of the lever 104 to hold said lever in the position to which it is moved. This movement of lever 104 effects pull on the flexible connection 108 against the bias thereof, this pull being transmitted to a device within the valve 110 to be hereinafter described to effect initial closing movement of the valve under its bias. As will be understood, however, from the description to be given hereinafter in connection with said valve operating device, said closing movement may be intercepted and the valve maintained partially open for reduced flow of the fluid through the meter. This condition of reduced flow, it will now be understood prevails during the measurement and the registration of the last 9 units of measurement by virtue of the limited movement of the dog 55 controlled by the roller 73 of smaller diameter bearing on the units wheel disc. When the register is set to an amount less than 10 units and the dog is in the position of Fig. 3, as above mentioned, the cam 53 will actuate the dog to move the lever 104 and position the valve in said partially open position.

When the numeral wheels of the register 1 all have returned to zero so that all of the rollers 73, 74, 75 and 76 may fully enter the notches of the discs respectively associated with the zero readings of said wheels, the further downward movement of the dog 55 takes place to the position shown in Fig. 4. Because the spring 66 draws the dog 55 against the stop 65 and because the latch 100 holds the lever 104 in the position of Fig. 3, after the lobe of the cam 53 passes, the dog 55 is clear of the step 112 and free to move further downwardly as the bell crank arm 58 is lowered under the bias of the spring 63. This additional downward movement of the dog 55 may take place within one revolution of the cam 53. When the dog 55 reaches its lowermost position as illustrated in Fig. 4, the toe thereof will engage the surface 114 of the lever 104. Because of the stepped arrangement of the surfaces 112 and 114, further pivotal movement of the lever 104 will be produced when the lobe of the cam 53 again comes into contact with the dog 55. This will effect a further pull on the flexible connection 108 and this additional movement of translation in this connection will operate the devices of the valve 110 again to effect release thereof and movement under its bias to the closed position of the valve which will stop flow of the fluid through the meter 35.

It will also be apparent that when the auto-stop or pre-settable register 1 is again set to effect rotation of the numeral wheels and their respective discs, the dog 55 will be withdrawn from the position shown in Fig. 4 and will be moved to the position shown in Fig. 2. Operation of the valve, as by means of the handle 111, to open the valve and produce flow of the fluid through the meter will initiate rotation of the shaft 32 and the rotation of shaft 51 as well as of shafts 8 and 10 through the flexible shaft 15, as above described, to produce integrating rotation of the register and return of the auto-stop register to zero position. The dog 55 will remain in the position shown in Fig. 4 as long as the auto-stop register remains at zero and until the auto-stop register is set for a subsequent dispersing operation.

In Fig. 5 is shown a mechanical device for effecting closing movement of the valve in two steps, that is, from the open position to a partially open position and thereafter to a fully closed position. A shaft shown in cross-section at 120 may be connected to the stem of a valve designed to operate by rotation or said shaft 120 may be otherwise connected by suitable devices to operate the stem of a valve in which opening and closing movement thereof is effected by lengthwise movement of the valve stem as disclosed in my copending application Serial No. 583,429, filed March 19, 1945. Upon the shaft 120 is fastened by means of a key 122 a disc 123 provided with ratchet teeth 125 and 127. The shaft 120, by means of a suitable torsion spring, not shown, or by action of a spring or other bias means in the valve to which the shaft is connected, may be biased to rotate in the direction of the arrow in Fig. 5 to effect closing movement of the valve.

Pivoted upon a fixed pin 130 is a pawl 131 arranged for engagement with the ratchet tooth 125 to prevent rotation of the disc 123 in the bias direction as shown by the arrow. The flexible connection described in connection with Figs. 1-4 is shown at 108 connected to the pawl 131. Pull exerted on the flexible connection 108 by actuation of the dog 55, as above described, produces pull in the direction of the arrow in Fig. 5. Upon disengagement of the pawl 131 from the tooth 125 of the disc 123, shaft 120 under its bias and disc 123 may rotate clockwise until the tooth 127 comes into engagement with the hook 133 of the pawl 134 also pivoted on the pin 130. The pawls 131 and 134 are biased to engagement with teeth 125 and 127 by the spring 135. Thus, after the pawl 131 has released the disc the hook 133 will limit movement of the disc 123. The relation of the teeth 125 and 127 to their respective pawls and to each other is such that this movement will bring the tooth 127 into engagement with hook 133 in less than full closing movement of the valve.

After this initial movement of the valve which may be produced by actuation of the dog 55 as described in connection with Fig. 3, further movement of the pawl 131 under actuation of the dog as described in connection with Fig. 4, brings the toe 137 formed as part of the pawl 131 into contact with the arm 139 pivoted at 140. The pull effected by the connection 108 under the actuation of the dog 55 as in Fig. 4, by virtue of the contact of the toe 137 with arm 139 produces pivotal movement of the arm 139 against the bias of the spring 142 supported to bear against the fixed member 143. The arm 139 is connected by link 145 to the pawl 134 and said pivotal movement of the arm 139 acting through this link pulls the pawl 134 out of engagement with the tooth 127 of the disc 123. Under the bias acting on the shaft 120 and the disc 123 further rotational movement of the disc 123 and of shaft 120 then may take place to effect full closure of the valve.

In Fig. 6 is illustrated a modification of the invention described in connection with Figs. 1 to 5 which utilizes electrical means for actuating the dog 55. It also utilizes electrical means for effecting operation of the register concomitantly with rotation of the meter. In some cases, the invention in this embodiment is preferable where the register is located at considerable distance from the meter. Although within the scope of the invention transmission from the auto-stop register to the meter and valve may be accomplished wholly by means of mechanical connections, and these connections may be of substantial length whether flexible or rigid, in those instances where there is a long distance between the register and the meter purely mechanical connections may involve excessive frictional losses. In such cases, electrical transmission may be provided and such transmission may be combined with mechanical control means connected between the meter and the valve as shown in Figs. 1-5.

In Fig. 6 an auto-stop register of conventional type is illustrated generally at 150 having discs 151, 152, 153, 154 respectively associated with the units, 10's, 100's and 1000's wheels. Associated with the respective discs are the rollers 155, 156, 157 and 158. The roller 155 is supported on a bell crank lever 159 pivoted at 160. The upwardly extending arm 161 of this bell crank carries one of two electrical contacts 162. Upon setting of the units wheel of the auto-stop register the roller 155 is moved out of the notch in the disc 151 associated with the units wheel and the contacts 162 are closed.

The rollers 156, 157 and 158 are rotatably supported on rod 163 carried in frame members 165 which are joined by rod 166 in a rigid unit, said rod and frame being pivotally supported in bearings 169. These rollers 156, 157 and 158 are moved simultaneously out of the notches in the respective discs upon rotation of one or more of the discs 152, 153, 154 associated respectively with the 10's, 100's, 1000's wheels. Pivotal movement of the frame 165 in this manner brings into engagement the contacts 168 of an electrical circuit actuated by projection 167 of the frame 165.

Attached to the frames 165 is rigid bar 171 which extends in overlapping relation to the bell crank lever 159. Pivotal movement of frame 165 by rotation of a wheel of higher order than the units wheel will cause bar 171 to press downwardly on lever 159 and hold switch 162 closed whenever the units wheel passes its zero while a higher wheel still indicates a registration. The contacts 162 and 168 are electrically connected in series and when both are closed by the actuation of both the units wheel disc 151 and the discs 152, 153, 154 associated with wheels of higher order an electric circuit will be closed from the supply 170 through said contacts to the solenoids 174 and 176 which are in series with each other and with said contacts 162 and 168, the other terminal of the solenoid 176 being connected to ground at 178.

In parallel with the contacts 168 but in series with contacts 162 is the resistance 180. Closing of both of the contacts 162 and 168 short circuits the resistance 180 to bring substantially the full electromotive force upon the solenoids. Opening of the contacts 168 upon return of the 10's wheel and all wheels of higher order to their zero readings places the resistance 180 in series with solenoids 174 and 176, thereby reducing the current flowing through these solenoids. This reduced flow of current continues until the return of the units wheel to zero, whereupon the contacts 162 are opened and the solenoids are deenergized.

Arranged beneath the solenoid 174 is an armature 184 carried by lever 186 pivotally supported at 188. Beneath the solenoid 176 is an armature 190 carried by lever 192 also pivotally supported at 188. The lever 186 also carries a pin 193 positioned to engage the lever 192 as shown in Fig. 6 as said lever 192 moves downwardly about the pivot 188 and so as to support the lever 192 when the lever 186 is held upwardly by action of the solenoid 174 when energized. When the solenoid 176 is insufficiently energized to hold the armature 190 in its upper position as shown in dotted outline in Fig. 6, the lever 192 will drop into engagement with the pin 193. The solenoid 174 may, however, hold the lever 186 in its upper position and the lever 192 in an intermediate position and preventing rotation of both levers 186 and 192 counter-clockwise about the pivot support 188. The resistance of the two solenoids is such that when both contacts 162 and 168 are closed the current flowing through the solenoids 174 and 176 is sufficient to hold both armatures 184 and 190 in their upper positions. When, however, reduction of the current occurs by cutting in the resistance 180 upon opening contacts 168 the design of the solenoid 176 is such that it exerts insufficient force to hold the armature 190 in its upper position. The design of the solenoid 174, nevertheless, is such that this reduced current is sufficient to energize the solenoid 174 to support the lever 186 as well as the lever 192.

It will be apparent from Fig. 6 that the movement of the lever 192 downwardly until it comes into contact with pin 193 effects downward movement of the dog 55 pivotally supported at 57 in the same manner as illustrated in Figs. 1 to 4 above-described. The position of the dog 55 in Fig. 6 is the same as that shown in Fig. 3, that is, the dog 55 is in intermediate position, having been moved to this position upon opening of the contacts 168 when the armature 190 was released by the weakened solenoid 176. The action of the latch 100 and its hook 102 and of the lever 104, as well as the action of cam 53 rotating on shaft 51 driven by meter 35, are the same as described in connection with Figs. 1-4.

In the embodiment shown in Fig. 6 the lever 104 is connected at its lower end to the valve 110 by a rod 200 corresponding to the flexible connection 108. If desired, in place of a stiff rod 200 a flexible connection such as a Bowden wire may be used. Rod 200 may be connected to actuate latch 131 as described in connection with Fig. 5. The operation of the valve 110 may be the same as that described in connection with Figs. 1 and 5.

Instead of using a mechanical connection to valve 110 from the lever 104 operated by dog 55 under impulse from cam 53, Figs. 1-6, an electrical circuit may be provided in which is connected electrical power means, such as a pair of solenoids, which are energized and deenergized under control of the dog. The solenoids may be arranged, as in Fig. 7, to operate the pawls 131 and 134 which effect restraint of the disc 123 against its bias as described in connection with Fig. 5. The solenoids 210 and 212 of Fig. 7 when energized respectively exert pull toward the left upon their movable cores 211 and 213. By means of torsion spring 215 supported upon stud 216 in fixed bracket 217, said spring having projecting ends which engage pins 218 and 219 on said cores, these cores are biased to move toward the right in Fig. 7 upon deenergization of the solenoids 210 and 212.

The pawls 131 and 134 are pivoted on fixed pin 130 as in Fig. 5 and engage ratchet teeth 125 and 127 for restraint and release of the disc 123 for the purpose of holding the valve open and to effect closing movements of the valve as described in connection with Fig. 5. Pawl 131 at the end opposite its tooth engaging point is connected as a link by pin 219 to core 213 of solenoid 212. Pawl 134 at the end opposite its hook 133 is connected as a link by pin 218 to core 211 of solenoid 210. Under the bias of spring 215 each pawl independently of the other is disengaged from the ratchet disc 123 when the solenoid to the core of which it is connected is deenergized.

To effect energization and deenergization of the solenoids concomitantly with actuation of the dog 55 by the cam 53, the lower end of the lever 104 may be provided with a bridging contact 225 supported on an extension of the lever 104 so as to move therewith to the different positions of said lever, as shown in Figs. 2, 3 and 4 and respectively indicated in full and in dotted and in dash lines in Fig. 7. The contact 225 bridges across fixed contacts 227 when the dog 55 is in the withdrawn position of Figs. 2 and 7. When upon interposition of dog 55 the lever 104 is moved to the intermediate position of Fig. 3 (dotted lines of Fig. 7) the contact 225 bridges the fixed contacts 229. One each of the contacts 227 and 229 is connected to ground at 230. The other contact 227 is connected to the solenoid 212 which actuates the pawl 131. This solenoid also is connected in series with the solenoid 210, which actuates pawl 134, and then to supply line 231. The other contact 229 is connected to the connection joining solenoids 210 and 212 so that this contact 229 is in series only with the solenoid 210. When the lever 104 is moved to the position of Fig. 4 (dash lines of Fig. 7) the bridging contact 225 is moved out of engagement with contacts 227 and 229 and both of the solenoids are deenergized.

Upon setting of the auto-stop register which effects withdrawal of dog 55 to what has been referred to as its initial position, the lever 104 is moved by spring 228 to the full line position in Fig. 7, thereby closing contacts 227 and energizing both solenoids. Both cores 211 and 213 are drawn toward the left in Fig. 7 and both pawls 131 and 134 are pivoted against the bias of spring 215 into engagement with ratchet disc 123. When rotation of this disc counter-clockwise in Fig. 7 is effected concomitantly with opening of the valve to which disc 123 is connected through shaft 120, pawl 131 is brought into engagement with tooth 125 to hold the valve open. Opening of contacts 227 by movement of lever 104 to the intermediate position (dotted lines) deenergizes solenoid 212 and releases disc 123 from pawl 131 to rotate clockwise until the hook 133 of pawl 134 engages tooth 127 of disc 123. The valve thus is moved to partially closed position as described in connection with Fig. 5. Subsequent opening of contacts 229 by further movement of lever 104 to the advanced position (dash line) deenergizes the solenoid 210 and releases pawl 134 from tooth 127 to effect full closure of the valve.

It will now be apparent that the operation of the valve connected to shaft 122 in Fig. 7 is under control of the dog 55, which in turn is controlled by the register in the same manner as above described in connection with Figs. 1 and 6. The requisite movement of the dog 55 to the withdrawn or initial position upon setting of the register and its subsequent movement to the second or intermediate and then to the third or advanced position in the return movement of the register, for actuation of the contacts 227 and 229, may be accomplished either by the mechanical driving connection of Fig. 1 or by the electrical means of Fig. 6. In either case, however, the register, by the mechanical driving connection of Fig. 1 or by the electrical means of Fig. 6, may be driven by means under control of the meter and the register, by its movement from the position to which it has been set, determines when cessation of delivery is initiated. This it does by moving the dog 55 to its first interposing position to produce partial closure of the valve, the dog being actuated in this position by the meter driven cam 53. Thereafter the register moves the dog to its second interposing position and the meter, actuating the dog in this second position, takes over completion of the delivery by effecting final closure of the valve precisely upon finishing the last full unit of the metered and delivered material.

I claim:

1. In a dispensing apparatus, the combination with a measuring device, means for controlling delivery of material to be measured through said device, and a register settable from an initial position to a position corresponding to the amount of material to be measured, and operable to return to said initial position, of a Bowden wire, means connected to said Bowden wire and actuated by said register for effecting movement of said Bowden wire lengthwise thereof in one direction upon setting movement of said register and in the opposite direction upon return of said register to said initial position, a dog connected to said Bowden wire and arranged to be moved thereby to occupy a given position when said register is in said initial position and to be withdrawn from said given position upon setting of said register, a rotatable element rotated by said measuring device and arranged in its rotation operatively to engage said dog at intervals when said dog occupies said given position but to pass clear of said dog when said dog is withdrawn from said position, means actuated by said dog upon said operative engagement thereof by said rotatable element for causing movement of said delivery control means toward its stop delivery position, and a driving connection between said measuring device and said register to effect said return movement of said register upon operation of said meter.

2. In a dispensing apparatus, the combination with a measuring device, and a register settable from an initial position to a position corresponding to the amount of material to be measured and operable to return to said initial position, of a shaft connected to said register to drive said register upon rotation of said shaft, a rotatable stop element connected to said shaft to rotate therewith, a motor operatively connected to said rotatable stop element for effecting rotation thereof, trip means engaged by said rotatable stop element at a given point in the rotation thereof to stop rotation of said shaft, and means actuated by said meter for intermittently actuating said trip means to release and again to engage said rotatable stop element to effect rotation of said shaft and of said register in step by step manner.

3. In a fluid dispensing apparatus, the combination with a fluid meter, a valve controlling flow of fluid through said meter, means operable by hand to open said valve and effective thereafter to hold said valve in open position until disengaged, and a register having a part movable to register units of measurement and a part moved in proportionate relation to said first part to register multiples of said units, said register being settable to an amount of fluid to be measured and being operable to return from said setting position to its initial position, of a member supported and arranged to be movable from an initial position to an advanced position in a path which includes a position intermediate between said advanced position and said initial position, said member also being supported for local movement thereof while in either of said positions, means actuated by said part of said register registering multiples of units and effective to move said member from said initial position to said intermediate position upon completion of registration of multiple units and actuated by said units part of said register to move said member to said advanced position upon completion of registration of the last unit of measurement, an element actuated by said fluid meter and arranged to engage said member when in either said intermediate or said advanced position to effect said local movement thereof, said member in said initial position being clear of engagement by said element, a piece actuatable by said member in its local movement in said intermediate position and operatively connected to said means for holding said valve open so as to effect when so actuated disengagement of said holding means and movement of said valve toward its closed position, means for intercepting said valve in said closing movement thereof and for holding it in partially open position, said piece also being actuatable by said member in its local movement in said advanced position so as again to effect disengagement of said holding means and movement of said valve to closed position, a mechanical power transmission element operatively connected to said register to operate said register in said return movement thereof upon power transmitting operation of said mechanical transmission element, power means connectible to said transmission element for effecting power transmitting operation of said transmission element, and means actuated intermittently by said meter for establishing power transmitting connection between said power means and said transmission element to transmit power to said register through said element at intervals corresponding to units of measurement as determined by said meter.

4. In a fluid dispensing apparatus, the combination with a fluid meter, and a valve for controlling flow of the fluid to be measured through said meter, of a register settable from a zero position to a position corresponding to the amount of fluid to be measured and operable to return to zero position, said register having a disc rotatable in proportionate relation to units of measurement and disc rotatable in proportionate relation to a multiple of said units of measurement, each of said discs having a recess at a point in its periphery corresponding to the zero indication for said disc, a pair of rollers mounted respectively adjacent the peripheries of said discs for movement concomitantly into full engagement with said recesses when said rollers respectively are in registry with said recesses and for movement concomitantly out of said recesses upon setting of said register, the diameters of said rollers and of said discs and the depths of said recesses respectively being such that when said units disc only is in a position of setting said rollers are held in a position intermediate between that of full engagement of said rollers with said recesses and the outer position which said rollers occupy when said multiples disc is in a position of setting, a dog supported for movement from an initial position to an advanced position in a path which also includes an intermediate position, said dog being supported for local movement thereof when in either said advanced or said intermediate position, means connecting said rollers to said dog to effect movement of said dog from said initial position to said advanced position when said rollers concomitantly enter both said recesses corresponding to said zero position of said register but to move said dog to its intermediate position in said path when said multiples disc indicates zero while said units disc holds said rollers in said intermediate position thereof, means actuated by said meter and effective at intervals corresponding to completion of successive units of measurement operatively to engage said dog to effect said local movement thereof when said dog is in either of said positions in said path but ineffective to engage said dog when in said initial position, means operatively connecting said dog with said valve to effect initial closing movement of said valve upon said local movement of said dog in said intermediate position, means for intercepting said valve in said initial movement thereof to hold said valve partially open, said connecting means being effective upon said local movement of said dog in said advanced position to release said valve from said intercepting means to produce full closure of said valve, a mechanical power transmission element operatively connected to said register to operate said register in said return movement thereof upon power transmitting operation of said mechanical transmission element, power means connectible to said transmission element for effecting power transmitting operation of said transmission element, and means actuated intermittently by said meter for establishing power transmitting connection between said power means and said transmission element to transmit power to said register through said element at intervals corresponding to units of measurement as determined by said meter.

5. In a dispensing apparatus, the combination with a measuring device, means for controlling delivery of material to be measured through said device, means to bias said delivery control means to its stop delivery position, means for holding said delivery control means in delivery position against said bias, a register settable from zero to a position representing the amount of material to be measured and returnable to zero, and means operatively connecting said measuring device to said register to return said register to zero concomitantly with operation of said measuring device, of a member supported to be movable between an initial position and an advanced position and to be movable locally in said advanced position, an element actuated by said measuring device during the measuring operation and arranged operatively to engage said member when said member is in said advanced position once in the measurement of each unit of delivered material to effect local movement of said member but ineffective to engage said member in said initial position, and means operatively connecting said register to said delivery control means to effect movement of said delivery control means toward its stop delivery position upon return of said register to zero, said last means comprising said member, said element, electrical means operatively connected to said register and cooperating therewith and with said member to move said member to said advanced position upon return of said register to zero, and means operatively connecting said member to said holding means to transmit said local movement of said member in said advanced position to said holding means to actuate said holding means to release said delivery control means to move under its bias toward its stop delivery position.

6. In a fluid dispensing apparatus, the combination with a fluid meter, a valve for controlling delivery of fluid to be measured through said meter, means to bias said valve to move to closed position, means effective when said valve is open for restraining said valve from moving to closed position, a register settable from zero to a position representing the amount of fluid to be measured and returnable to zero, and means operatively connecting said meter to said register to return said register to zero concomitantly with operation of said meter, of a member supported to be movable between an initial position and an advanced position and to be movable locally in said advanced position, an element actuated by said meter and operatively engaging said member when said member is in said advanced position at intervals corresponding to units of measurement as measured by said meter to effect said local movement of said member, said member in said initial position being incapable of engagement by said element, electrically operated means operatively connected to said restraining means and operable for actuating said restraining means to release said valve to move under its bias towards closed position, said electrical means being operatively connected to said register and to said member so as to be operated to effect said actuation of said restraining means upon said actuation of said member by said element when said member is in said advanced position.

7. In a fluid dispensing apparatus, the combination with a fluid meter, a valve for controlling delivery of fluid to be measured through said meter, said valve being biased to move to its closed position, a register having a units wheel and a wheel for registering multiples of said unit, said register being settable from zero position to a position corresponding to the amount of fluid to be measured and being operable to return to zero position, and means operatively connecting said meter to said register to return said register to zero concomitantly with operation of said meter, of a member supported to be movable from an initial position successively to a second position and a third position, means actuated by said fluid meter and operatively engaging said member when in either said second or said third position at intervals corresponding to units of measurement and incapable of engaging said member in said initial position thereof, means for restraining said valve against its bias from moving to closed position, electrical means operable for actuating said restraining means to release said valve to move toward its closed position under its bias, means including said member operatively connecting said register to said restraining means, said connecting means being actuated by said multiples wheel to move said member to said second position upon completion of registration of all but a predetermined number of units of measurement and being actuated by said units wheel to move said member from said second to said third position upon completion of registration of the last unit of measurement, said connecting means and said member being actuated by said means actuated by said meter to operate said electrical means to actuate said restraining means to release said valve when said member is operatively engaged in said second position and thereafter to intercept said valve to hold it partially open, said connecting means and said member being actuated by said means actuated by said meter to operate said electrical means to actuate said restraining means to release said valve to move to closed position when said member is operatively engaged in said third position.

8. In a fluid dispensing apparatus, the combination with a fluid meter, a valve for controlling delivery of fluid to be measured through said meter, a register having a units wheel and a tens wheel and settable from zero position to a position corresponding to the amount of fluid to be measured operable to return to zero position, and means operatively connecting said meter to said register to return said register to zero concomitantly with operation of said meter, of means operated by said units wheel for opening and closing a connection in an electrical circuit, means operated by said tens wheel for opening and closing a connection in said electrical circuit, a member supported to be movable from an initial position successively to a second position and a third position, electrical actuated power means in said circuit for moving said member to and from said positions, means actuated by said electrical actuated power means to effect movement of said member to said second position upon operation of said electrical connection means operated by said tens wheel and to effect movement of said member to said third position upon operation of said electrical connection means operated by said units wheel, means actuated by said measuring device and operatively engaging said member when in either said second position or said third position at intervals corresponding to units of measurement, means cooperating with said member when operatively engaged in said second position and operatively connected to said valve for effecting partial closure of said valve to control delivery of said fluid at a reduced rate, and means cooperating with said member when operatively engaged in said third position and operatively connected to said valve for effecting full closure of said valve so as to stop delivery of said fluid.

9. In a dispensing apparatus, the combination with a measuring device, means for controlling delivery of material to be measured through said device, and a register settable from an initial position to a position corresponding to the amount of material to be measured and operable to return to said initial position, of a flexible shaft operatively connected to said register to drive said register upon rotation of said shaft, means actuated intermittently by said measuring device and operatively connected to said shaft to rotate said shaft in step by step manner to effect return of said register to said initial position, said steps corresponding to units of measurement measured by said measuring device, and means controlled by said register to be effective when said register is in said initial position so as to be actuated by said measuring device at intervals corresponding to said units of measurement and operatively connected to said delivery control means for moving said delivery control means to its stop delivery position at completion of the last unit of measurement by said measuring device.

10. In a dispensing apparatus, the combination with a measuring device, means for controlling delivery of material to be measured through said device, and a register settable from an initial position to a position corresponding to the amount of material to be measured and operable to return to said initial position, of a flexible shaft operatively connected to said register to drive said register upon rotation of said shaft, means actuated intermittently by said measuring device and operatively connected to said shaft to rotate said shaft in step by step manner to effect return of said register to said initial position, said steps corresponding to units of measurement measured by said measuring device, means controlled by said register to be effective when said register is in said initial position so as to be actuated by said measuring device at intervals corresponding to said units of measurement and operatively connected to said delivery control means for moving said delivery control means to its stop delivery position at completion of the last unit of measurement by said measuring device, and means connected between said flexible shaft and said register for effecting step by step movement of said register relative to the rotation of said flexible shaft.

11. In a dispensing apparatus the combination with a fluid meter, a valve for controlling delivery of fluid through said meter, a register remotely located with respect to said meter and settable from zero to a position representing the amount of fluid to be measured and operable to return to zero from said setting position, of a member located adjacent said meter and operatively connected to and actuated by said register upon setting thereof to move to an initial position and upon return of said register to zero to move to an advanced position, an element actuated by said meter during metering operation thereof and arranged operatively to engage said member when in said advanced position once in the measurement of each unit of delivered fluid but ineffective to engage said member in said initial position thereof, means actuated by said member upon said operative engagement thereof by said element and operatively connected to said valve for effecting closing movement of said valve, means providing a mechanical driving connection between said meter and said register to effect return movement of said register to zero, and means adjacent to and actuated intermittently by said meter at intervals corresponding to successive units of measurement as determined by said meter to produce step by step operation of said driving connection and step by step return movement of said register to zero.

12. In a dispensing apparatus the combination as defined in claim 11 in which said means providing a mechanical driving connection between said meter and said register comprises a mechanical power transmission element operatively connected to said register to operate said register in said return movement thereof upon power transmitting operation of said mechanical transmission element, power means connectible to said transmission element for effecting power transmitting operation of said transmission element, and means actuated intermittently by said meter for establishing power transmitting connection between said power means and said transmission element to transmit power to said register through said element at intervals corresponding to units of measurement as determined by said meter.

CHARLES S. HAZARD.

REFERENCES CITED

The following references are of record in the file of this patent:

UNITED STATES PATENTS

| Number | Name | Date |
|---|---|---|
| 1,607,899 | Long | Nov. 23, 1926 |
| 1,656,049 | Damrow | Jan. 10, 1928 |
| 1,759,396 | Granberg | May 20, 1930 |
| 1,876,512 | Pfenning | Sept. 6, 1932 |
| 2,060,674 | Hicks | Nov. 10, 1936 |
| 2,193,474 | Brayer | Mar. 12, 1940 |
| 2,228,820 | Griffith et al. | Jan. 14, 1941 |
| 2,319,444 | Crosby | May 18, 1943 |
| 2,321,062 | Bergman et al. | June 8, 1943 |
| 2,358,712 | Hinds | Sept. 19, 1944 |